United States Patent
Giaconi et al.

(10) Patent No.: US 9,294,260 B2
(45) Date of Patent: Mar. 22, 2016

(54) PHASE ADJUSTMENT CIRCUIT FOR CLOCK AND DATA RECOVERY CIRCUIT

(71) Applicants: Stefano Giaconi, Phoenix, AZ (US); Mingming Xu, Phoenix, AZ (US)

(72) Inventors: Stefano Giaconi, Phoenix, AZ (US); Mingming Xu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/142,606

(22) Filed: Dec. 27, 2013

(65) Prior Publication Data

US 2015/0188693 A1    Jul. 2, 2015

(51) Int. Cl.
*H04L 7/00* (2006.01)
*H04L 7/033* (2006.01)
*H04L 25/03* (2006.01)

(52) U.S. Cl.
CPC ............ *H04L 7/0041* (2013.01); *H04L 7/0058* (2013.01); *H04L 7/0331* (2013.01); *H04L 25/03025* (2013.01); *H04L 25/03057* (2013.01); *H04L 2025/03598* (2013.01)

(58) Field of Classification Search
CPC ... H04L 7/0041; H04L 7/0058; H04L 7/0331; H04L 25/03057; H04L 25/03025; H04L 2025/03598
USPC .......................................... 375/354, 316, 326
See application file for complete search history.

(56) References Cited

U.S. PATENT DOCUMENTS

| | | | |
|---|---|---|---|
| 7,099,424 B1 | 8/2006 | Chang et al. | |
| 8,130,887 B2 | 3/2012 | Cranford et al. | |
| 8,942,334 B1 * | 1/2015 | Zortea et al. | 375/355 |
| 2006/0224339 A1 | 10/2006 | Kim et al. | |
| 2010/0329326 A1 | 12/2010 | Aziz et al. | |

FOREIGN PATENT DOCUMENTS

WO    WO 2013/085811 A1    6/2013

OTHER PUBLICATIONS

PCT Notification of Transmittal of the International Search Report and the Written Opinion for PCT Counterpart Application No. PCT/US2014/066897, 12 pgs., (Feb. 26, 2015).

* cited by examiner

*Primary Examiner* — Vineeta Panwalkar
(74) *Attorney, Agent, or Firm* — Blakely, Sokoloff, Taylor & Zafman LLP

(57) ABSTRACT

Described are phase adjustment circuits for clock and data recovery circuits (CDRs). Systems and apparatuses may include an input to receive a serial data signal, an edge data tap to sample transition edges in the serial data signal for generating a data edge detection signal, a CDR circuit including a phase detector to receive the serial data signal and the data edge detection signal, and to output a phase lead/lag signal indicating the phase difference between the serial data signal and the data edge detection signal, and a phase adjustment circuit to generate phase lead/lag adjustment data. The CDR circuit is to output a recovered clock signal based, at least in part, on the phase lead/lag signal adjusted by the phase lead/lag adjustment data.

16 Claims, 9 Drawing Sheets

PHASE ADJUSTMENT CIRCUIT FOR CLOCK AND DATA RECOVERY CIRCUIT

BACKGROUND

Clock and Data Recovery (CDR) circuits are important receiver (RX) components in serializer/de-serializer (SerDes) designs, such as high speed serial input/output (I/O) designs. In order to transmit serial data at a high speed, the CDR extracts phase information from received serial data and generates a clock in synchronization with the data—i.e., outputs recovered clock and data signals for the RX component.

The ability to generate an accurate clock signal from an incoming data stream requires a sampling position that yields the lowest bit error rate (BER). For high-speed serial data transmissions, baud rate phase detection is frequently used rather than over-sampling processes due to its simplicity and low power consumption.

The principle of known baud rate phase detection processes, such as Mueller-Müller phase detection, is to detect the best sampling position based on the combined pulse response through the use of error information, which is defined by comparing the incoming data signal to a reference threshold at the sampler input; however, for interconnections having high speeds or high insertion loss (e.g., due to a long channel), these known baud rate phase detection processes produce sub-optimal samples, leading to incorrect clock and data recovery results.

BRIEF DESCRIPTION OF THE DRAWINGS

Non-limiting and non-exhaustive embodiments of the disclosure are described with reference to the following figures, wherein like reference numerals refer to like parts throughout the various views unless otherwise specified.

DESCRIPTION OF THE EMBODIMENTS

Figure 1:
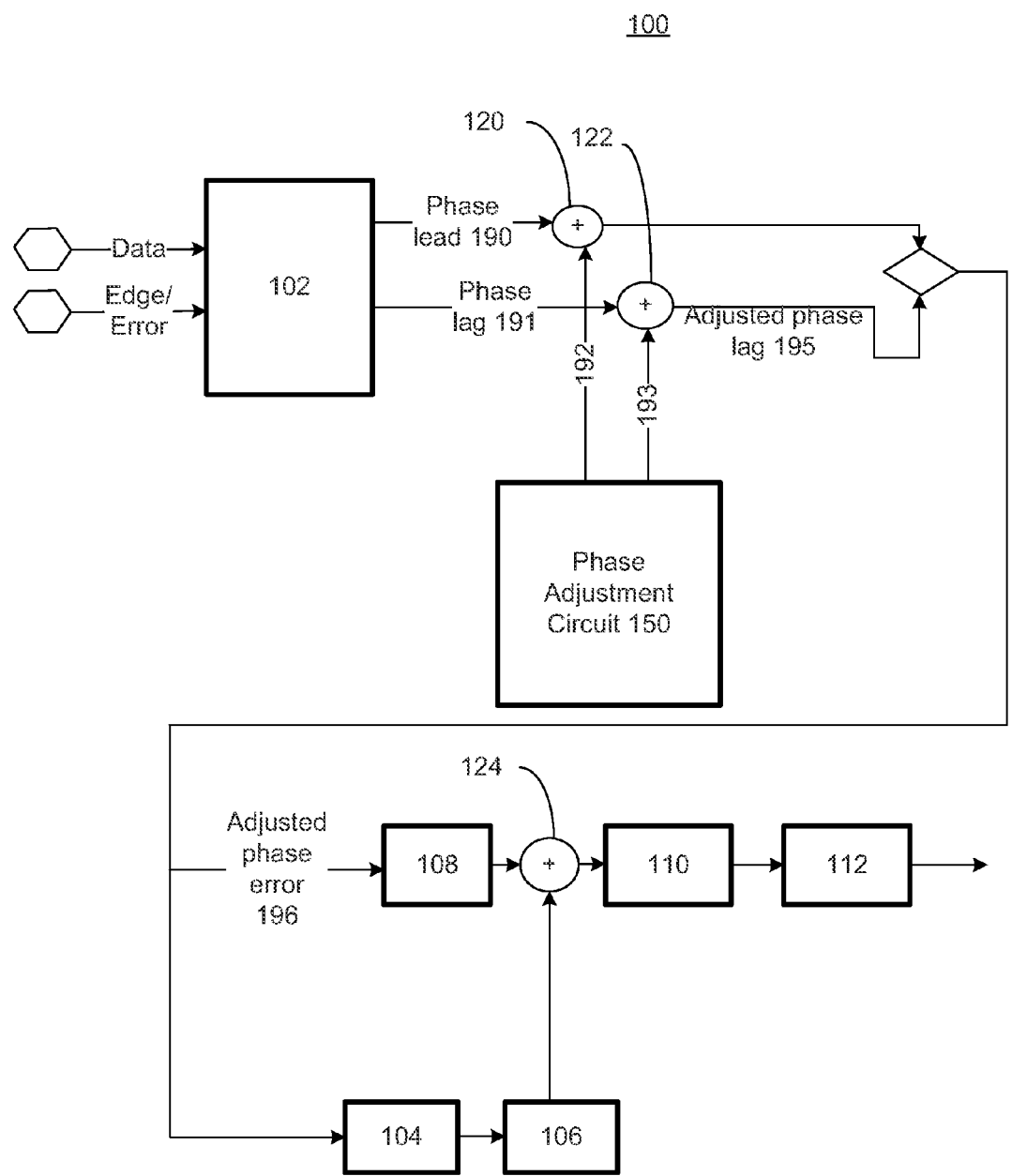
FIG. 1 is an illustration of a clock and data recovery circuit including a phase adjustment circuit according to an embodiment of the disclosure.

Embodiments of the disclosure describe phase adjustment circuits for clock and data recovery (CDR) circuits. In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nanotubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 is an illustration of a CDR circuit 100 including a phase adjustment circuit according to an embodiment of the disclosure. In this embodiment, CDR circuit 100 includes phase detector 102 generating phase lead pulse 190 and phase lag pulse 191, phase adjustment circuit 150, summation circuits 120 and 122 to produce adjusted phase lead 194 and adjusted phase lag 195, respectively, that is received by frequency loop gain 104 and phase loop gain 108. The outputs of phase loop gain 108 and frequency accumulator 106 are received by summation circuit 124. Phase accumulator 110 receives the output of summation circuit 124, and produces a phase offset value, which is received by low pass filter 112.

CDR circuit 100 is shown to receive data and edge/error sampling signals generated from data and edge/error samplers (not shown) of a receiving (RX) component. Phase detector 102 measures the phase difference between the sampled data and edge/error sampling signals and outputs phase information indicating whether there is a phase lead or a phase lag error, shown in this figure as phase lead pulse 190 and phase lag pulse 191. CDRs generate a phase error signal that indicates whether the edge/error signal transitions early or late relative to a transition in the incoming data signal. This phase error signal (shown, in this embodiment, as adjusted phase signal 196 which is adjusted, in part, by phase adjustment circuit 150 as further described below) is received by phase loop gain 108 and frequency loop gain 104 to apply a fixed gain to the signal. Frequency accumulator 106 accumulates the phase errors and produces a frequency offset value, which is received by summation circuit 124, along with the output of phase loop gain 108. Phase accumulator 110 receives the output of summation circuit 124, and produces a phase offset value, which is received by low pass filter 112. Low pass filter 112 thus produces recovered clock and data signals according to the frequency offset and phase offset values.

CDR circuits frequently employ baud rate phase detection processes that produce sub-optimal samples, leading to incorrect clock and data recovery results. In embodiments of the disclosure, phase adjustment circuit 150 is used to adjust the phase lead/lag signals produced by phase detector 102 in order to generate a more accurate data clock signal. Phase adjustment circuit 150 outputs adjustment phase lead signal 192 and adjustment phase lad signal 193 to be added phase lead 190 and phase lag 191 via summation circuits 120 and 122, respectively, to generate adjusted phase lead signal 194 and adjusted phase lag signal 195. As described below, embodiments of the disclosure may be used for a variety of interconnections, and phase adjustment circuit 150 may vary in its design accordingly.

Figure 2:
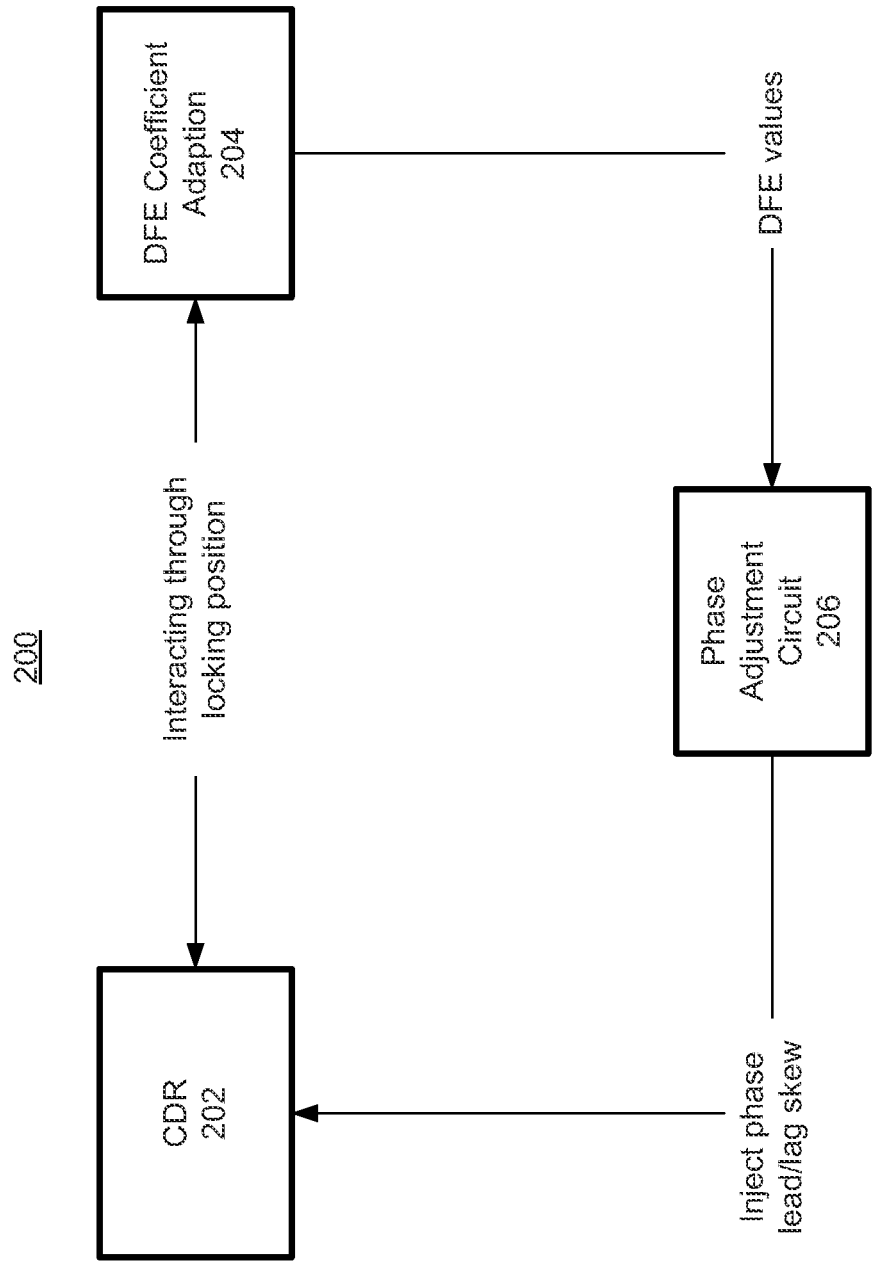
FIG. 2 is a block diagram of a phase adjustment circuit utilizing a decision feedback equalization circuit according to an embodiment of the disclosure.

FIG. 2 is a block diagram of a phase adjustment circuit 200 utilizing a decision feedback equalization (DFE) circuit according to an embodiment of the disclosure. Circuit 200 is shown to include CDR circuit 202, DFE circuit 204, and phase adjustment circuit 206. During operation of circuit 200, CDR circuit 202 utilizes DFE circuit 204 to determine a locking position of the recovered clock signal with respect to the data edges of the input data signal.

A Linear Equalizer (LE) circuit is used, in part, to remove inter-symbol interference (ISI) due to high frequency channel loss in a high speed serial I/O interface. For interconnects where insertion loss becomes significant, such as long interconnects, the data needs to be equalized in order for the system to be able to recover he data. The LE circuit removes interference components on the current bit based on previous and/or next received data. Equalization data in the form of LE coefficients values are generated to decide a value of the current received data based on the previous and/or next bits. A LE may include a pre-cursor (or feed forward) equalizer (FFE) and a post-cursor (or feedback) equalizer (DFE). The pre-cursor and post-cursor equalizer may comprise a linear transversal filter to cancel pre-cursor and post-cursor ISI.

Thus, baud rate based CDR locking positions are dependent on DFE 204 in these embodiments. In real-world runtime applications, the locking position of CDR 202 suffers systematic offset if equalized data signals are used during phase detection, as those implemented in most designs. The magnitude and direction of this systematic offset is closely related to the magnitude and sign of the DFE post-cursor. For example, given the DFE post-cursor is mostly negative in dispersive channels, the baud rate CDR locking position will shift left from the center of the data eye (i.e., the data eye being a diagram to represent a high speed digital signal. A data eye diagram is constructed from a digital waveform by folding the parts of the waveform corresponding to each individual bit into a single graph with signal amplitude on the vertical axis and time on horizontal axis. This construction is repeated over many samples of the waveform, and the resultant graph represents the average statistics of the signal and resembles an eye).

In order to solve this systematic offset issue in the CDR locking position, embodiments of the disclosure utilize phase adjustment circuit 206. As described below, signal adjust circuit 206 receives CDR current locking position and DFE values as input and adaptively shifts the locking position back to the center.

In prior art serializer/de-serializer (SerDes) designs, the CDR block weakly interacts with the DFE adaption block through locking position—i.e. the CDR's locking position impacts the final DFE values and vice versa. Usually the bandwidth of CDR and DFE adaption is separated so that they do not interfere with each other. In this embodiment, phase adjustment circuit 206 is disposed between CDR 202 and DFE 204 in order to inject the right amount of phase shift (lead/lag) to "cancel" the systemic offset (e.g., to produce the adjusted phase lead/lag signals as shown in FIG. 1).

In order to cancel the systemic offset described above (e.g., to produce the adjusted phase lead/lag signals as shown in FIG. 1), simply inserting a constant "opposite offset" into CDR loop does not work because any constant offset added within CDR loop is cancelled by the loop itself. Referring back to FIG. 2, to create the "opposite offset," phase adjustment circuit 206 is to statistically skew the phase lead and lag generated by the CDR. The amount, polarity and frequency of the skew injection are mainly determined by the DFE values.

Figure 3:
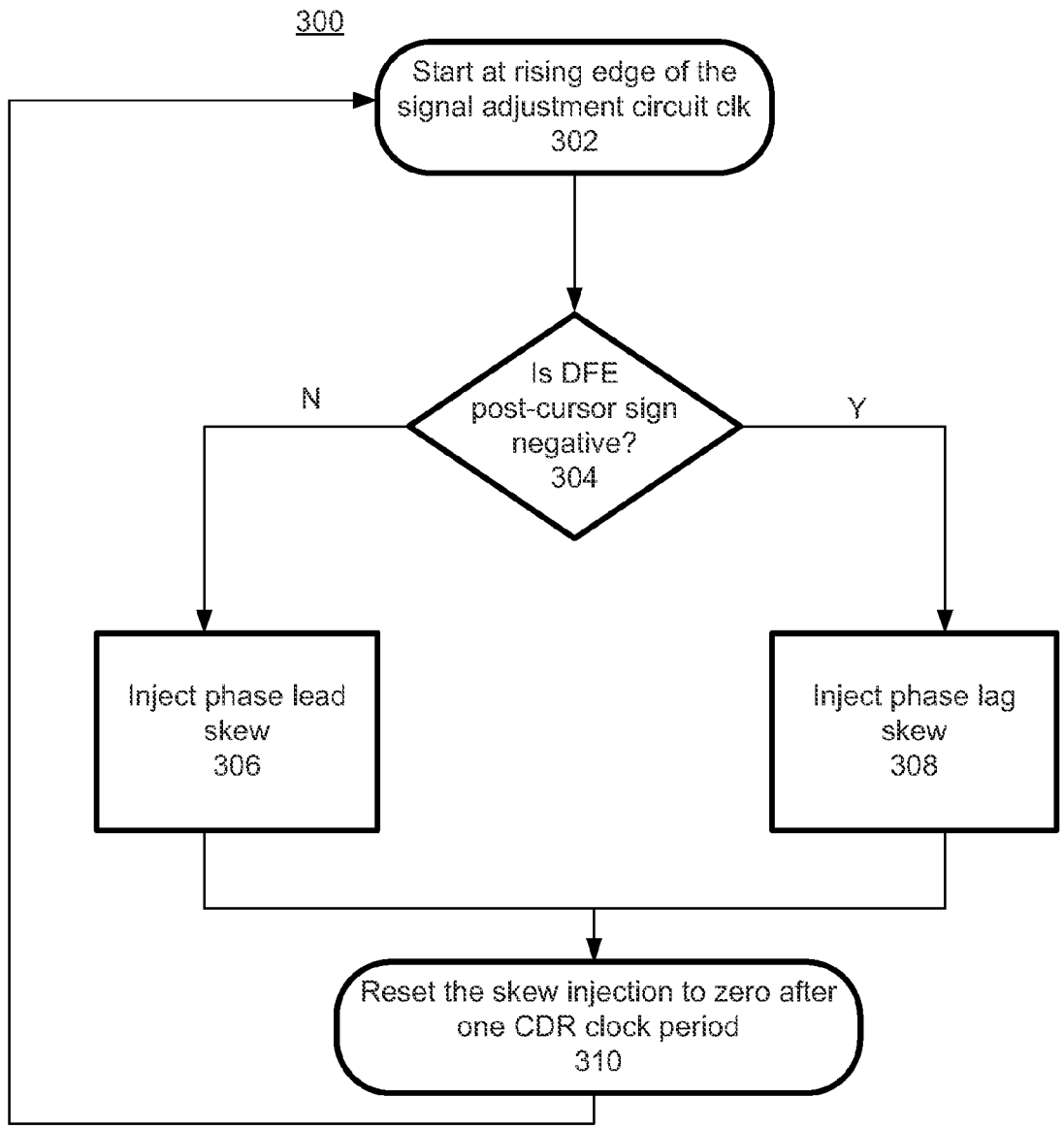
FIG. 3 is a flow diagram of a signal adjustment process utilizing decision feedback equalization adaptation data according to an embodiment of the disclosure.

FIG. 3 is a flow diagram of a signal adjustment process 300 utilizing DFE adaption data according to an embodiment of the disclosure. Flow diagrams as illustrated here provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 300 describes an implementation of the skew injection operations described above to modulate the frequency of the skew injection of a CDR based on DFE values. Based on the DFE post-cursor value of a DFE tap (e.g., the first tap or any other tap of a linear combination of the DFE post-cursor taps), the higher the DFE post-cursor value is, the higher frequency the skew injection is.

Operation 302 determines when the phase adjustment circuit clock is at a rising edge. Assuming, for example, the sign of the data captured by the (first) DFE post-cursor tap is supposed to be negative (i.e., as it would be in most dispersive channels), without adjustment, operation 304 determines if the DFE post-cursor sign is in fact negative. If the DFE post-cursor sign is negative, then the CDR locking position is presumed to be to the "right" of the center of the respective data eye.

If the DFE post-cursor sign is not negative, the CDR locking position is shifted to the right (i.e., towards the center of the respective data eye) by injecting phase lead skew, 306. If it is negative, the CDR locking position is shifted to the left (i.e., towards the center of the respective data eye) by injecting phase lag skew, 308. Thus, the phase adjustment circuit injects phase lead skew so that the CDR loop counter acts with more phase lag by moving the sampling position to the right (to the center of the eye). The above described injected phase lead/lag skew adjustment data is usually equal to or greater than the maximum magnitude of the phase lead/lag generated from the phase detection circuits. By injecting this phase lead/lag skew, the phase adjustment circuits (e.g., circuit 206 of FIG. 2) insert one phase lead error into the CDR loop. The above described skew injection is reset to zero after one CDR clock period, 310. It is to be understood that the above process may vary in other embodiments (e.g., the DFE post-cursor decision may be based on whether the value positive rather than negative).

Figure 4:
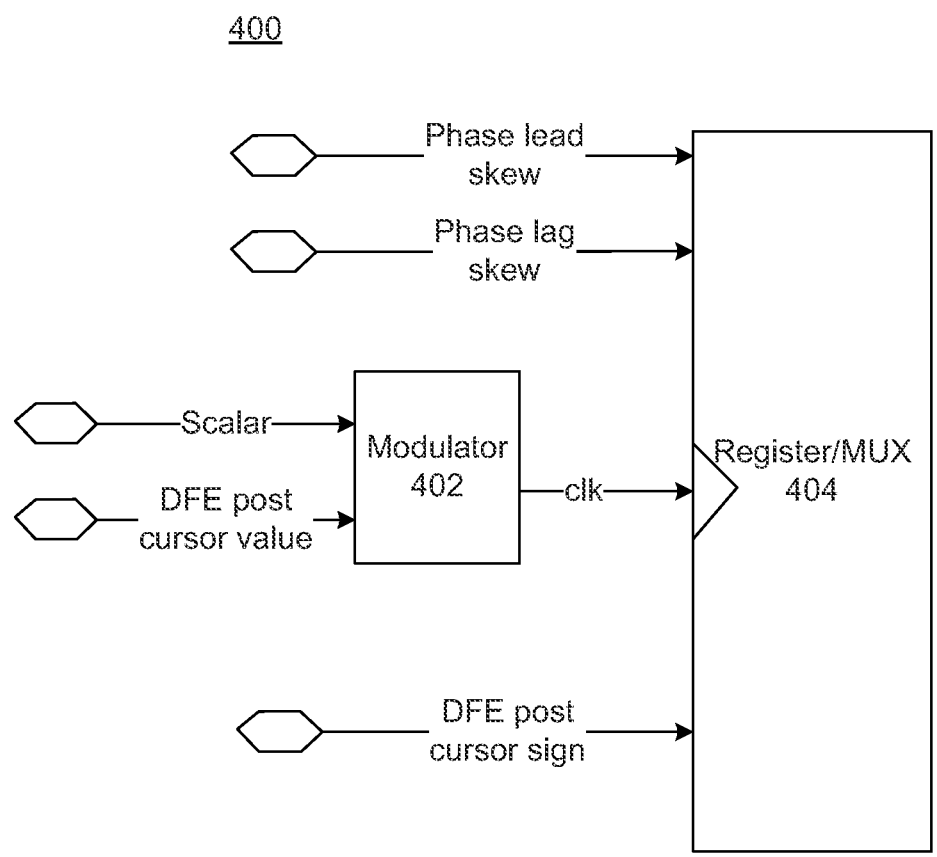
FIG. 4 is an illustration of a phase adjustment circuit utilizing decision feedback equalization data according to an embodiment of the disclosure.

FIG. 4 is an illustration of a phase adjustment circuit 400 utilizing DFE data according to an embodiment of the disclosure. In this embodiment, circuit 400 may correspond to phase adjustment circuit 150 of FIG. 1, and is shown to include modulator 402 and register/MUX 404. Modulator 402 receives (in this example) the DFE post-cursor value and a pre-determined scalar, and then generates a clock whose frequency is proportional to the DFE post-cursor value. Registers and MUX 404 output a phase lead/lag skew based on the clock generated by modulator 402 and an arbitrary pre-configured skew value, wherein the DFE post-cursor sign selects the output.

In some embodiments, phase adjustment circuits (such as phase adjustment circuits 400 of FIG. 4 and 206 of FIG. 2) are used for low insertion loss channels (e.g., short reach, long reach or low operating speed I/O interfaces) that do not utilize DFE circuits. When high amplitude signals coming from low insertion loss channels reach the receiver pads, prior art receiving systems may provide some sort of additional insertion loss in order for the CDR to function properly; otherwise the resulting locking point may be compromised (i.e., moved away from the center of the data eye). The introduction of additional insertion loss structures, and/or voltage dividers in the data path is not desirable, because to allow operations at lower data rates, degradation at higher (more desirable and difficult) data rates are incurred, and extra power and area are utilized.

In order to solve this systematic offset issue in the CDR locking position when dealing with short channels and/or low data rates, embodiments of the disclosure may configure samplers that are typically already present in high data rate receiver architectures (half-rate, quarter-rate, octave-rate, etc.) where there are at least two separate sets of error samplers for the even and odd path in the architecture. The two separate sets of samplers operate with a predetermined small skew in terms of clock phase delay. In the embodiments, a state machine analyzes the average of the error samples from these error samplers, and provides a skew into the early/late decision of the phase detectors to shift the locking position back towards the center of the data eye.

In embodiments of the disclosure, two digital signals are used and compared—the data signal, which represents the value of the specific data bit (i.e., a sampled signal referenced to zero), and the error signal, which represents the sampled signal referenced to a differential reference voltage.

Figure 5:
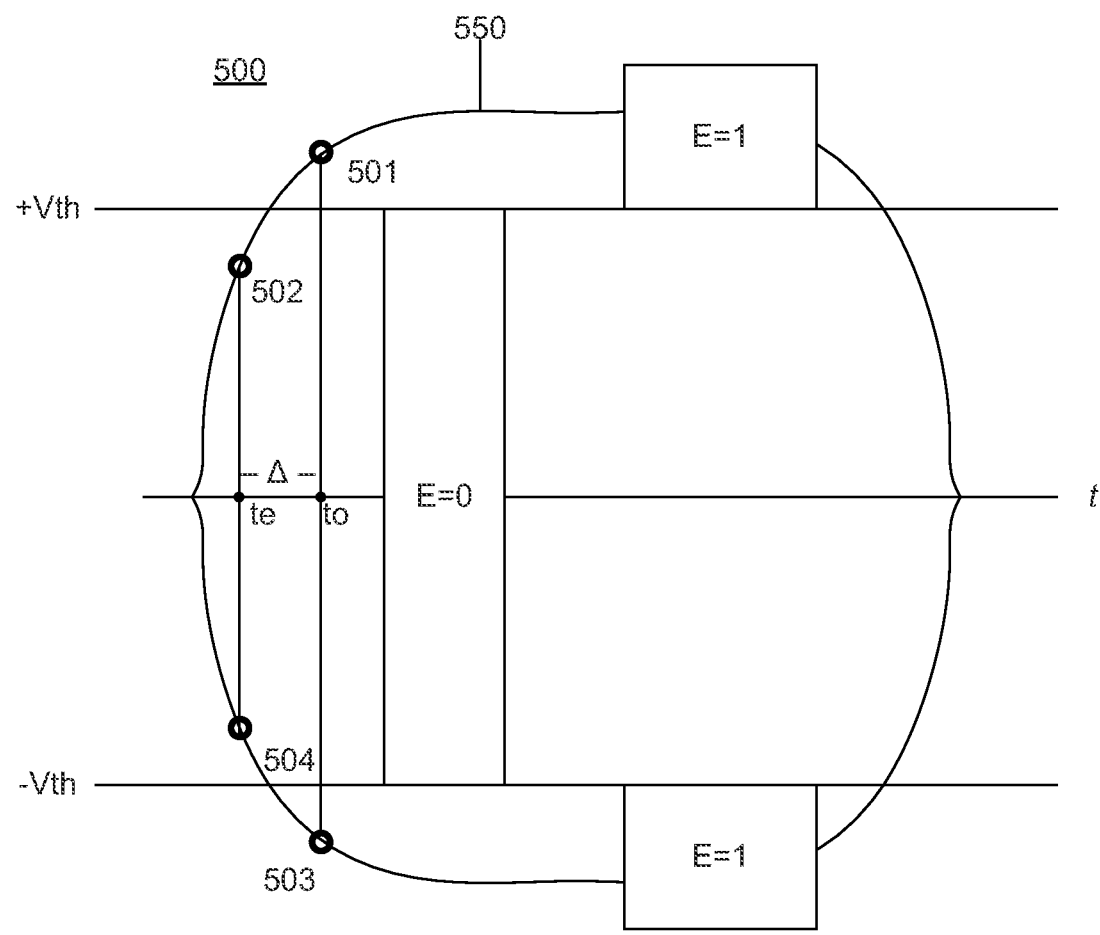
FIG. 5 is an illustration of the behavior of samplers for phase adjustment circuits according to an embodiment of the disclosure.

FIG. 5 is an illustration graph 500 of the behavior of samplers for phase adjustment circuits according to an embodiment of the disclosure. In this illustration, graph 500 the error signal (E) outputs a '0' when the sampled signal is within the differential voltage threshold level (Vth); the error signal (E) outputs a '1' when the sampled signal exceeds the threshold level. When properly equalized, the error signal (E) is equally '0' and '1'; if the signal is over-equalized, and/or the signal saturates, the error signal is not linear anymore; thus, the eye diagram is not centered on the best horizontal sampling position. This may also occur because the CDR bandwidth may be many orders of magnitude larger than the equalization adaptation bandwidth in order to guarantee certain jitter tolerance requirements, and so the CDR may dictate the initial locking position, and the equalization adaptation may adjust the locking position around the initial locking spot.

To calculate the amount of skew needed, embodiments of the disclosure differentiate between the "even" error sampler and the "odd" error sampler. For example, in some embodiments, the odd samplers have an introduced a known delay $\Delta$ (usually 1 or 2 phase interpolator steps apart). By adding the delay, the even samples are collected from an eye location slightly ahead of the odd samples. Graph 500 illustrates this, as even sample 502 of data eye 550 is shown to be collected before odd sample 501, which is delayed by $\Delta$.

This example implies that, from a statistical point of view, the average sampling position will be exactly in the middle between points to and to. The addition of the time offset between even and odd samples allows determining whether the CDR circuit is locked in a location of data eye 550 that is near an edge. As illustrated for this example, graph 500 illustrates an average error samples produced by the odd samplers contain a higher number of 1s (i.e., exceeding threshold value Vth, such as odd sample data points 501 and 503) than the average error samples produced by the even samplers (i.e., which will sample a smaller amplitude on average such as even sample data points 502 and 504). The opposite is true if the CDR circuit is locked on the right side of data eye 500.

Figure 6:
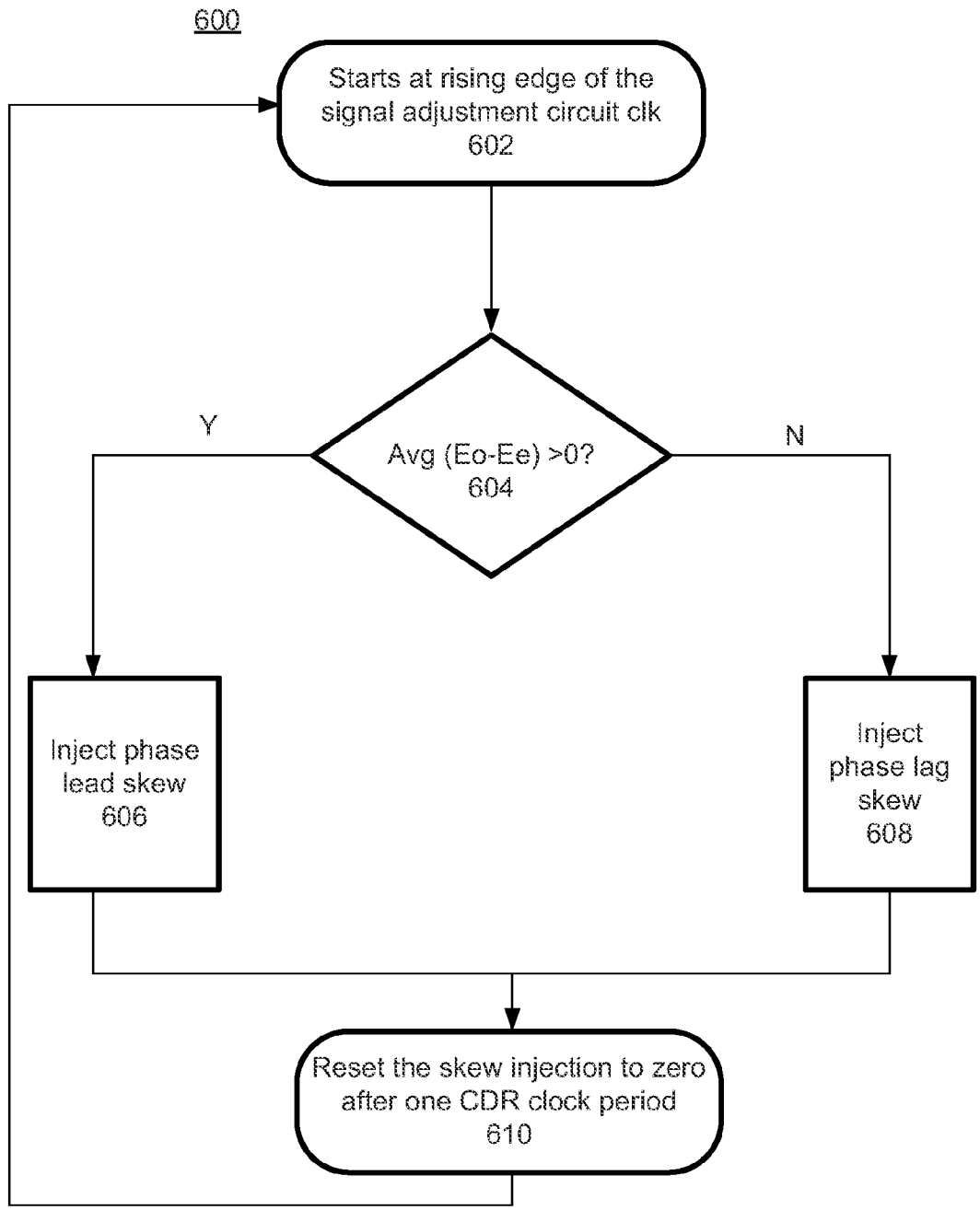
FIG. 6 is a flow diagram of a signal adjustment process utilizing two sets of sample data according to an embodiment of the disclosure.

FIG. 6 is a flow diagram of a signal adjustment process 600 utilizing two sets of sample data according to an embodiment of the disclosure. Flow diagrams as illustrated here provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 600 illustrates operations for injecting the right amount of phase shift (i.e., lead/lag) to "cancel" the systemic CDR offset described above. To create the "opposite offset," embodiments of the disclosure skew the phase lead and lag generated by the phase detectors. The amount, polarity and frequency of the skew injection are mainly determined by the amount of average difference between the odd and even error samplers.

Operation 602 determines when the phase adjustment circuit clock is at a rising edge. Assuming the sign of (Eo-Ee) is positive (i.e., as it would be most over equalized channels if the even samplers sample ahead of the odd samplers), then without adjustment the CDR locking position shifts to the left of the center of the data eye.

Thus, the average difference between odd samples and even samples is determined to be negative or positive, 604. If the average difference is positive (i.e., odd samples are more often higher than a threshold voltage compared to the even samples), then the CDR locking position is shifted to the right (i.e., towards the center of the respective data eye) by injecting phase lead skew, 606. If it is negative (i.e., odd samples have a lower absolute value than the even samples), the CDR locking position is shifted to the left (i.e., towards the center of the respective data eye) by injecting phase lag skew, 608. The above described skew injection is reset to zero after one CDR clock period, 610. It is to be understood that the above process may vary in other embodiments (e.g., odd samplers may be scheduled ahead of even samplers, etc.).

Figure 7:
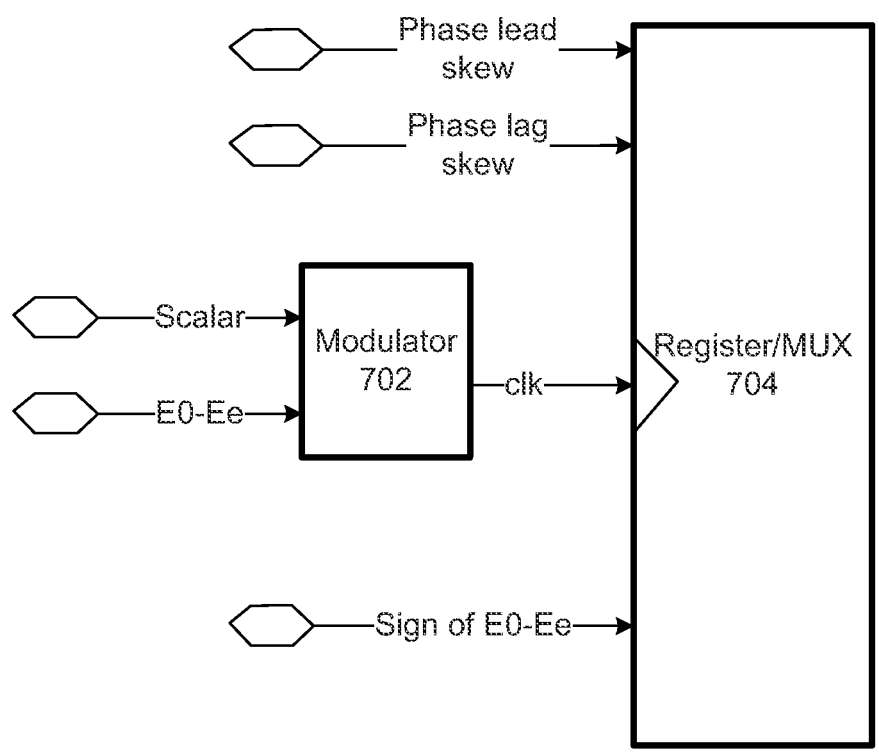
FIG. 7 is an illustration of a phase adjustment circuit utilizing two sets of sample data according to an embodiment of the disclosure.

FIG. 7 is an illustration of a phase adjustment circuit 700 utilizing two sets of sample data according to an embodiment of the disclosure. In this embodiment, circuit 700 may correspond to phase adjustment circuit 150 of FIG. 1, and is shown to include modulator 702 and register/MUX 704. Modulator 702 receives the difference between even and odd samplers (Eo-Ee), and then generates a clock, whose frequency is proportional to the average of said differences (Eo-Ee). Registers and MUX 704 outputs a phase lead/lag skew based on the clock generated by modulator 704 and an arbitrary skew pre-configured skew value, wherein the DFE post-cursor sign selects the output. Thus, the frequency of the skew injection is modulated based on the averages of (Eo-Ee). Given (Eo-Ee) as an example, the higher the (Eo-Ee) value is, the higher frequency the skew injection is. The polarity (lead/lag) of the injection depends on the sign of (Eo-Ee).

As illustrated in this embodiment, circuit 700 is equivalent to circuit 400 of FIG. 4, with the distinction between the two embodiments being the inputs to the above described modulators and registers/muxes (i.e., multiplexers). Thus, some embodiments may include both types of phase adjustment circuits, and select the phase adjustment values to use based on the properties of the data receiving channel.

Figure 8:
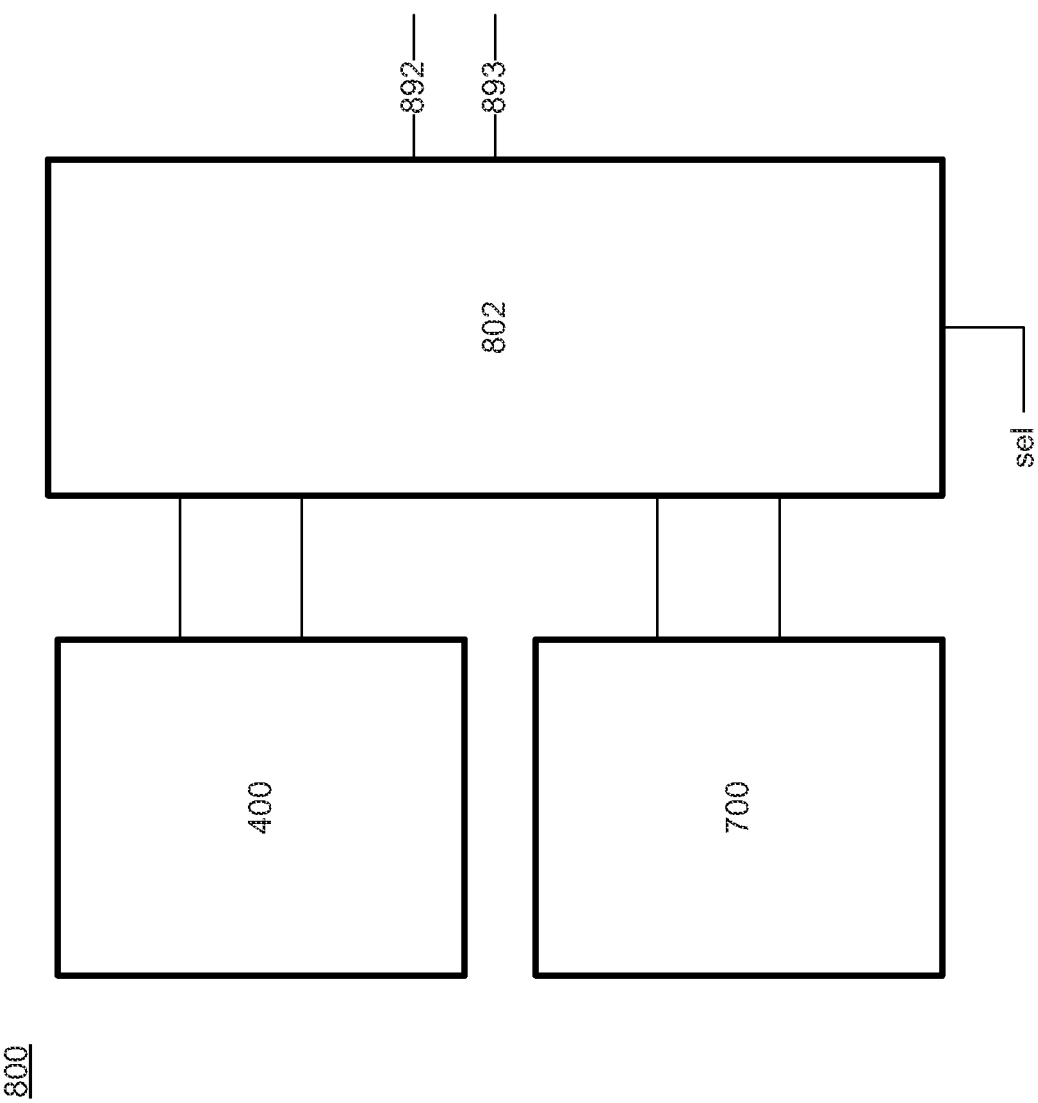
FIG. 8 is an illustration of a phase adjustment circuit according to an embodiment of the disclosure.

FIG. 8 is an illustration of a phase adjustment circuit 800 according to an embodiment of the disclosure. In this embodiment, phase adjustment circuit 800 may correspond to phase adjustment circuit 150 of FIG. 1 and is shown to include phase adjustment circuit 400 of FIG. 4 and phase adjustment circuit 700 of FIG. 7, and MUX 802 to select between said phase adjustment circuits to generate phase lead adjustment data 892 and phase lag adjustment data 893. Said selection of one of the phase adjustment circuits is based on the properties of the data receiving channel. For example, adjustment circuit 400 may be used for high speed I/O channels with data rates of +8 Gbps and/or channels with high insertion loss that utilize DFE feedback loops, while adjustment circuit 700 may be used for I/O channels with lower data rates and/or lower insertion loss channels.

In other embodiments, fewer components may be used to implement multiple types of phase adjustment circuits. For example, some embodiments may implement the components of circuit 400/700, and simply select the appropriate inputs for the above described modulator (402/702) and registers/mux (404/704).

Figure 9:
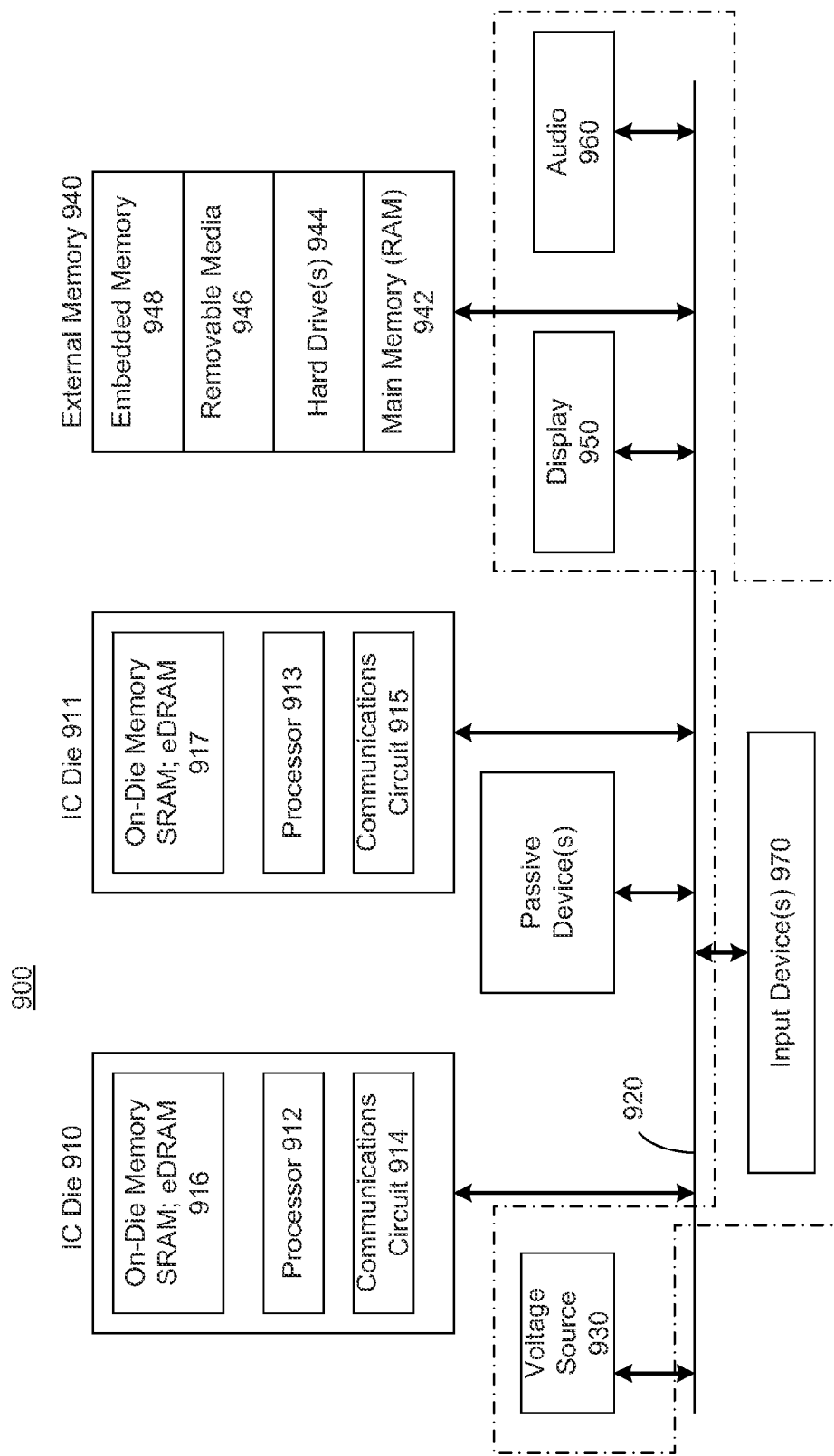
FIG. 9 is an illustration of a computer system to utilize an embodiment of the disclosure.

FIG. 9 is an illustration of a computer system 900 to utilize an embodiment of the disclosure. Computer system 900 (also referred to as the electronic system 900) as depicted may comprise components utilizing any of the I/O interfaces with phase adjustment circuits described above. The I/O channels and interfaces used by embodiments of the disclosure may include, but are not limited to channels and interfaces such as those consistent with Peripheral Component Interconnect express (PCIe) Revision 3.0 (PCI Express Base Specification Revision 3.0, published Nov. 10, 2010), Revision 4.0 (not yet published), 802.3bj (IEEE 802.3bj: 100GBASE-CR4 Specifications, published May 2012), Optical Internetworking Forum Common Electrical Interface (OIF-CEI) 28G (CEI-28G: Paving the Way for 100 Gigabit, published June 2010), etc.

Computer system 900 may be a mobile device such as a netbook computer. Computer system 900 may be a mobile device such as a wireless smart phone. Computer system 900 may be a desktop computer. The computer system 900 may be a hand-held reader. Computer system 900 may be a wearable computing device.

In an embodiment, system 900 is a computer system that includes system bus 920 to electrically couple the various components of the electronic system. System bus 920 is a single bus or any combination of busses according to various embodiments. System 900 includes voltage source 930 that provides power to integrated circuit 910. In some embodiments, the source 930 supplies current to integrated circuit 910 through system bus 920.

Integrated circuit 910 is electrically coupled to system bus 920 and includes any circuit, or combination of circuits according to an embodiment. In an embodiment, integrated circuit 910 includes processor 912 that can be of any type. As used herein, processor 912 may mean any type of circuit such as, but not limited to, a microprocessor, a microcontroller, a graphics processor, a digital signal processor, or another processor. In an embodiment, SRAM embodiments are found in memory caches of the processor. Other types of circuits that can be included in integrated circuit 910 are a custom circuit or an application-specific integrated circuit (ASIC), such as communications circuit 914 for use in wireless devices such as cellular telephones, smart phones, pagers, portable computers, two-way radios, and similar electronic systems. In an embodiment, processor 910 includes on-die memory 916 such as static random-access memory (SRAM). In an embodiment, processor 910 includes embedded on-die memory 916 such as embedded dynamic random-access memory (eDRAM).

In an embodiment, integrated circuit 910 is complemented with subsequent integrated circuit 911. Useful embodiments include dual processor 913 and dual communications circuit 915 and dual on-die memory 917 such as SRAM. In an embodiment, dual integrated circuit 911 includes embedded on-die memory 917 such as eDRAM.

In an embodiment, electronic system 900 also includes an external memory 940 that in turn may include one or more memory elements suitable to the particular application, such as main memory 942 in the form of RAM, one or more hard drives 944, and/or one or more drives that handle removable media 946, such as diskettes, compact disks (CDs), digital variable disks (DVDs), flash memory drives, and other removable media known in the art. External memory 940 may also be embedded memory 948 such as the first die in an embedded TSV die stack, according to an embodiment.

In an embodiment, electronic system 900 also includes display device 950 and audio output 960. In an embodiment, electronic system 900 includes an input device such as controller 970 that may be a keyboard, mouse, trackball, game controller, microphone, voice-recognition device, or any other input device that inputs information into electronic system 900. In an embodiment, input device 970 is a camera. In an embodiment, input device 970 is a digital sound recorder. In an embodiment, input device 970 is a camera and a digital sound recorder.

As shown herein, integrated circuit 910 may be implemented in a number of different embodiments that utilize the I/O interfaces with phase adjustment circuits according to any of the several disclosed embodiments and their equivalents, an electronic system, a computer system, one or more methods of fabricating an integrated circuit, and one or more methods of fabricating an electronic assembly that includes a semiconductor package having I/O interfaces with phase adjustment circuits according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed semiconductor package having transistors to utilize any of the previously discussed I/O interfaces with phase adjustment circuits and their equivalents. A foundation substrate may be included, as represented by the dashed line of FIG. 9. Passive devices may also be included, as is also depicted in FIG. 9.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the disclosure but to illustrate it. The scope of the disclosure is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, embodiments of the disclosure may describe an apparatus including an input to receive a serial data signal, an edge data tap to sample transition edges in the serial data signal for generating a data edge detection signal, a clock and data recovery (CDR) circuit including a phase detector to receive the serial data signal and the data edge detection signal, and to output a phase lead/lag signal indicating the phase difference between the serial data signal and the data edge detection signal, and a phase adjustment circuit to generate phase lead/lag adjustment data. The CDR circuit is to output a recovered clock signal based, at least in part, on the phase lead/lag signal adjusted by the phase lead/lag adjustment data.

In some embodiments, apparatuses may further comprise a decision feedback equalization (DFE) loop to provide equalization to the CDR circuit based, at least in part, on pre-cursor and post-cursor data samples of the serial data signal captured by a pre-cursor tap and a post-cursor tap, respectively, of the DFE. The phase adjustment circuit is to generate the phase lead/lag adjustment data based, at least in part, on one of the pre-cursor or the post-cursor data samples captured by the DFE. In some of these embodiments, the phase adjustment circuit is to generate phase lead adjustment data in response to the post-cursor data sample having a positive value, and wherein the phase adjustment circuit to generate phase lag adjustment data in response to the post-cursor data sample having a negative value. In other embodiments, the phase lead/lag adjustment data comprises a value greater than a value of the phase lead/lag signal indicating the phase difference between the serial data signal and the data edge detection signal.

In some embodiments, apparatuses may further comprise a first data tap and a second data tap to sample the serial data signal to generate first and second signal samples, respectively, wherein the first data tap is to sample the serial data signal before the second data tap by a predetermining timing offset; the phase adjustment circuit is to generate the phase lead/lag adjustment data based, at least in part, on the difference between the first and second signal samples. In some of these embodiments, the phase adjustment circuit is to generate phase lead adjustment data in response to the first signal sample comprising data higher than a threshold voltage, and the second signal sample comprising data lower than a threshold voltage. In other embodiments, the phase adjustment circuit is to generate phase lag adjustment data in response to the first signal sample comprising data lower than a threshold voltage, and the second signal sample comprising data higher than a threshold voltage.

Embodiments may describe a system comprising a processor, a memory, a wireless interface for allowing the processor to communicate with another device, and a system bus communicatively coupling the processor and the memory. At least one of the memory or the processor includes a serial input/output (I/O) interface comprising, an input to receive a serial data signal an edge data tap to sample transition edges in the serial data signal for generating a data edge detection signal, a clock and data recovery (CDR) circuit including a phase detector to receive the serial data signal and the data edge detection signal, and to output a phase lead/lag signal indicating the phase difference between the serial data signal and the data edge detection signal, and a phase adjustment circuit to generate phase lead/lag adjustment data. The CDR circuit is to output a recovered clock signal based, at least in part, on the phase lead/lag signal adjusted by the phase lead/lag adjustment data.

In some embodiments, the serial I/O interface further comprises a decision feedback equalization (DFE) loop to provide equalization to the CDR circuit based, at least in part, on pre-cursor and post-cursor data samples of the serial data signal captured by a pre-cursor tap and a post-cursor tap, respectively, of the DFE; the phase adjustment circuit is to generate the phase lead/lag adjustment data based, at least in part, on one of the pre-cursor or the post-cursor data samples captured by the DFE. In some of these embodiments, the phase adjustment circuit for the serial I/O interface is to generate phase lead adjustment data in response to the post-cursor data sample having a positive value, and wherein the phase adjustment circuit is to generate phase lag adjustment data in response to the post-cursor data sample having a negative value. In other embodiments, the phase lead/lag adjustment data comprises a value greater than a value of the phase lead/lag signal indicating the phase difference between the data signal and the data edge detection signal.

In some embodiments, the serial I/O interface further comprises a first data tap and a second data tap to sample the serial data signal to generate first and second signal samples, respectively, wherein the first data tap is to sample the serial data signal before the second data tap by a predetermining timing offset; the phase adjustment circuit is to generate the phase lead/lag adjustment data based, at least in part, on the difference between the first and second signal samples. In some of these embodiments, the phase adjustment circuit of the serial I/O interface is to generate phase lead adjustment data in response to the first signal sample comprising data higher than a threshold voltage, and the second signal sample comprising data lower than a threshold voltage. In other embodiments, the phase adjustment circuit of the serial I/O interface is to generate phase lag adjustment data in response to the first signal sample comprising data lower than a threshold voltage, and the second signal sample comprising data higher than a threshold voltage.

Embodiments may describe an apparatus comprising a decision feedback equalization (DFE) loop to utilize pre-cursor and post-cursor data samples of a serial data signal captured by a pre-cursor tap and a post-cursor tap, respectively, of the DFE, a first and a second phase adjustment circuit, the first phase adjustment circuit to generate a first phase lead/lag adjustment data based, at least in part, on one of the pre-cursor or the post-cursor data samples captured by the DFE, the second phase adjustment circuit to generate a second phase lead/lag adjustment data based, at least in part, on a difference between first and second signal samples different than the pre-cursor and post-cursor data samples, and selection circuitry to select the first or the second set of phase lead/lag adjustment data based, at least in part, on a detected insertion loss of the serial data signal.

In some embodiments, the first phase adjustment circuit is to generate phase lead adjustment data in response to the post-cursor data sample having a positive value, and wherein the phase adjustment circuit to generate phase lag adjustment data in response to the post-cursor data sample having a negative value.

In some embodiments, the first phase lead/lag adjustment data comprises a value greater than a value of the phase lead/lag signal indicating the phase difference between the serial data signal and a corresponding data edge detection signal.

In some embodiments, the second phase adjustment circuit is to generate phase lead adjustment data in response to the first signal sample comprising data higher than a threshold voltage, and the second signal sample comprising data lower than a threshold voltage.

In some embodiments, the second phase adjustment circuit is to generate phase lag adjustment data in response to the first signal sample comprising data lower than a threshold voltage, and the second signal sample comprising data higher than a threshold voltage.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
an input to receive a serial data signal;
an edge data tap to sample transition edges in the serial data signal for generating a data edge detection signal;
a clock and data recovery (CDR) circuit including a phase detector to receive the serial data signal and the data edge detection signal, and to output a phase lead/lag signal indicating the phase difference between the serial data signal and the data edge detection signal;
a phase adjustment circuit to generate phase lead/lag adjustment data;
wherein the CDR circuit is to output a recovered clock signal based, at least in part, on the phase lead/lag signal adjusted by the phase lead/lag adjustment data; and
a decision feedback equalization (DFE) loop to provide equalization to the CDR circuit based, at least in part, on pre-cursor and post-cursor data samples of the serial data signal captured by a pre-cursor tap and a post-cursor tap, respectively, of the DFE loop, wherein the phase adjustment circuit is to generate the phase lead/lag adjustment data based, at least in part, on one of the pre-cursor or the post-cursor data samples captured by the DFE loop.

2. The apparatus of claim 1, wherein the phase adjustment circuit is to generate phase lead adjustment data in response to the post-cursor data sample having a positive value, and wherein the phase adjustment circuit to generate phase lag adjustment data in response to the post-cursor data sample having a negative value.

3. The apparatus of claim 1, wherein the phase lead/lag adjustment data comprises a value greater than a value of the phase lead/lag signal indicating the phase difference between the serial data signal and the data edge detection signal.

4. The apparatus of claim 1, further comprising:
a first data tap and a second data tap to sample the serial data signal to generate first and second signal samples, respectively, wherein the first data tap is to sample the serial data signal before the second data tap by a predetermining timing offset;
wherein the phase adjustment circuit is to generate the phase lead/lag adjustment data based, at least in part, on the difference between the first and second signal samples.

5. The apparatus of claim 4, wherein the phase adjustment circuit is to generate phase lead adjustment data in response to the first signal sample comprising data higher than a threshold voltage, and the second signal sample comprising data lower than a threshold voltage.

6. The apparatus of claim 4, wherein the phase adjustment circuit is to generate phase lag adjustment data in response to the first signal sample comprising data lower than a threshold voltage, and the second signal sample comprising data higher than a threshold voltage.

7. A system comprising:
a processor;
a memory;
a wireless interface for allowing the processor to communicate with another device; and
a system bus communicatively coupling the processor and the memory;
wherein at least one of the memory or the processor includes a serial input/output (I/O) interface comprising:
an input to receive a serial data signal;
an edge data tap to sample transition edges in the serial data signal for generating a data edge detection signal;
a clock and data recovery (CDR) circuit including a phase detector to receive the serial data signal and the data edge detection signal, and to output a phase lead/lag signal indicating the phase difference between the serial data signal and the data edge detection signal;
a phase adjustment circuit to generate phase lead/lag adjustment data;
wherein the CDR circuit is to output a recovered clock signal based, at least in part, on the phase lead/lag signal adjusted by the phase lead/lag adjustment data, and
a decision feedback equalization (DFE) loop to provide equalization to the CDR circuit based, at least in part, on pre-cursor and post-cursor data samples of the serial data signal captured by a pre-cursor tap and a post-cursor tap, respectively, of the DFE loop;
wherein the phase adjustment circuit is to generate the phase lead/lag adjustment data based, at least in part, on one of the pre-cursor or the post-cursor data samples captured by the DFE loop.

8. The system of claim 7, wherein the phase adjustment circuit for the serial I/O interface is to generate phase lead adjustment data in response to the post-cursor data sample having a positive value, and wherein the phase adjustment circuit is to generate phase lag adjustment data in response to the post-cursor data sample having a negative value.

9. The system of claim 7, wherein the phase lead/lag adjustment data comprises a value greater than a value of the phase lead/lag signal indicating the phase difference between the data signal and the data edge detection signal.

10. The system of claim 7, wherein the serial I/O interface further comprises:
a first data tap and a second data tap to sample the serial data signal to generate first and second signal samples, respectively, wherein the first data tap is to sample the serial data signal before the second data tap by a predetermining timing offset;
wherein the phase adjustment circuit is to generate the phase lead/lag adjustment data based, at least in part, on the difference between the first and second signal samples.

11. The system of claim 10, wherein the phase adjustment circuit of the serial I/O interface is to generate phase lead adjustment data in response to the first signal sample comprising data higher than a threshold voltage, and the second signal sample comprising data lower than a threshold voltage.

12. The system of claim 10, wherein the phase adjustment circuit of the serial I/O interface is to generate phase lag adjustment data in response to the first signal sample comprising data lower than a threshold voltage, and the second signal sample comprising data higher than a threshold voltage.

13. An apparatus comprising:
an input to receive a serial data signal;
an edge data tap to sample transition edges in the serial data signal for generating a data edge detection signal;
a clock and data recovery (CDR) circuit including a phase detector to receive the serial data signal and the data edge detection signal, and to output a phase lead/lag signal indicating the phase difference between the serial data signal and the data edge detection signal;
a phase adjustment circuit to generate phase lead/lag adjustment data;
wherein the CDR circuit is to output a recovered clock signal based, at least in part, on the phase lead/lag signal adjusted by the phase lead/lag adjustment data; and
wherein the phase adjustment circuit to generate the phase lead/lag adjustment data based, at least in part, on one of pre-cursor or the post-cursor data samples the serial data signal captured by a decision feedback equalization (DFE) loop.

14. The apparatus of claim 13, wherein the DFE loop to provide equalization to the CDR circuit based, at least in part, on the pre-cursor and post-cursor data samples of the serial data signal captured by the DFE loop.

15. The apparatus of claim 13, wherein the phase adjustment circuit is to generate phase lead adjustment data in response to the post-cursor data sample having a positive value, and wherein the phase adjustment circuit to generate phase lag adjustment data in response to the post-cursor data sample having a negative value.

16. The apparatus of claim 13, wherein the phase lead/lag adjustment data comprises a value greater than a value of the phase lead/lag signal indicating the phase difference between the serial data signal and the data edge detection signal.

* * * * *